June 13, 1967  C. T. BATTS  3,324,889
SOLENOID-ACTUATED VALVE
Filed Aug. 31, 1964
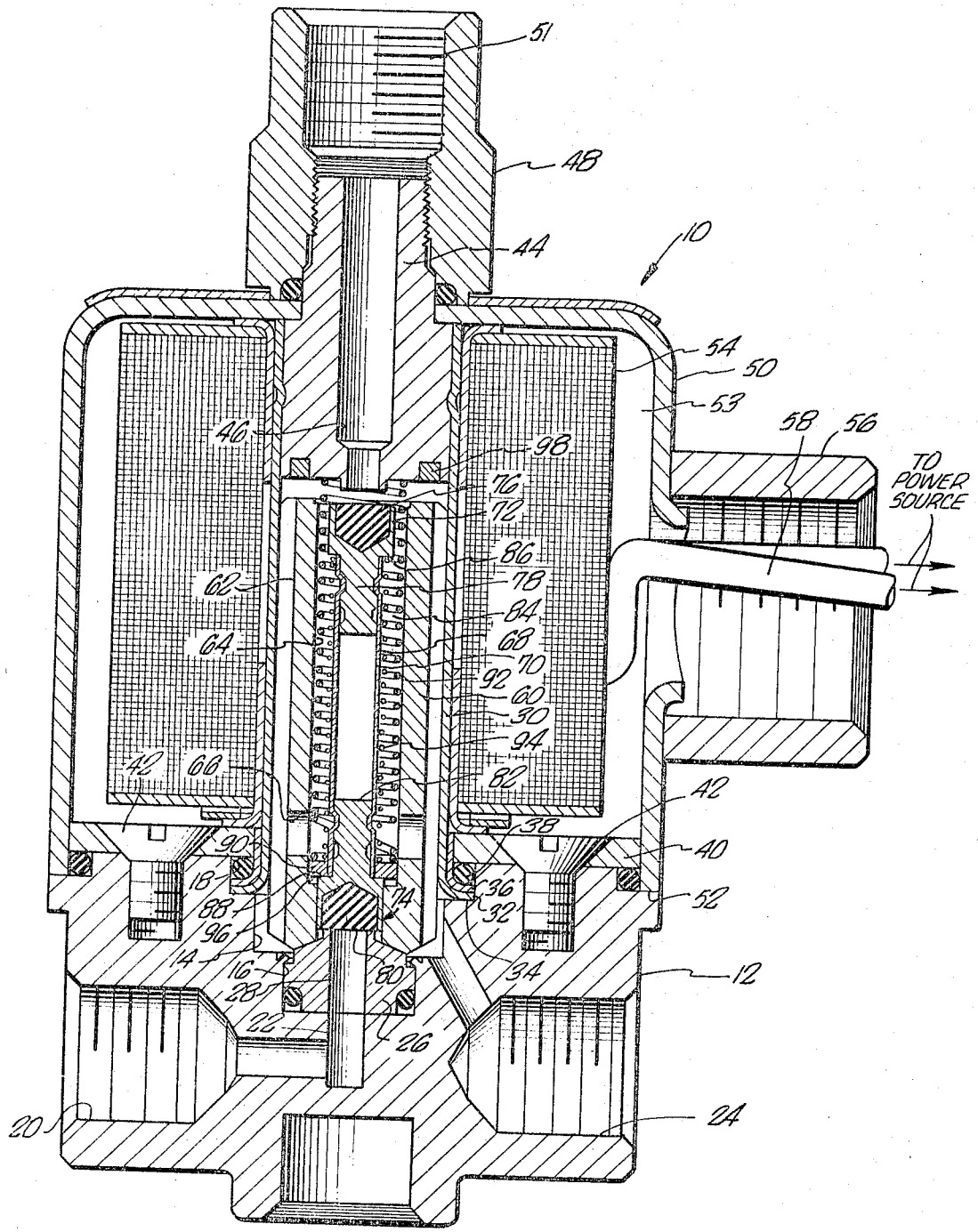
INVENTOR.
CARL T. BATTS
BY
*Christie, Parker & Hale*
ATTORNEYS.

United States Patent Office 3,324,889
Patented June 13, 1967

3,324,889
SOLENOID-ACTUATED VALVE
Carl T. Batts, San Marino, Calif., assignor to Barksdale Manufacturing Corporation, Vernon, Calif., a corporation of California
Filed Aug. 11, 1964, Ser. No. 394,102
3 Claims. (Cl. 137—625.69)

This invention relates to solenoid-actuated fluid-flow control valves.

Solenoid-actuated valves for controlling fluid flow are utilized in many different flow control systems. A typical application of such valves is an assembly which includes a main valve for controlling the cycling of a pressure fluid and a solenoid-actuated pilot valve for selectively controlling the operation of the main valve. In such an assembly, cycling through the main valve is usually responsive to fluid pressures established as a result of control of the cycled pressure fluid by the main valve under the direction of the solenoid-actuated pilot valve. Such assemblies are frequently used with pressure fluid actuated components which require fast operation and high-speed cycling of the fluids. The latter may be air or other gases, water, light oils, or other liquids.

The solenoid-actuated flow control valve of the present invention provides a structure which is capable of being cycled continuously for many millions of cycles without damage to its elements, and with a minimum of wear to the elements producing sealing contact in the valve. Further, it provides seating of the sealing elements so that flow of fluids is rapidly and effectively blocked responsive to energization or de-energization of the solenoid. As a result of these characteristics, the valve of the present invention is capable of application in a wide variety of installations involving many different fluid control problems.

Solenoid-actuated fluid flow control valves conventionally include a base having at least one or more flow passages and a plunger actuable by an electromagnetic coil to open and close the flow passages responsive to energization and de-energization of the coil. The plunger is movable within a sleeve and is stopped by striking a stop at one end of the sleeve. As one aspect of the present invention, the valve includes a sleeve having an outwardly extending peripheral flange joined to one end. The sleeve is joined at its other end to a plug which acts as a stop for plunger travel. Means are provided for holding resilient packing means against the surface of the flange facing the other end of the sleeve and for securing the flange and packing means relative to the base.

In operation, activation of the plunger causes it to strike the plug at one end of the sleeve with a substantial amount of force. Since valves of this type are cycled continuously for millions of cycles, fatigue and wear of parts results in prior art devices. This is because the sleeve and its associated plug are secured to the base by a rigid joint. In the present invention, the resilient packing means enables the sleeve and the plug to move as a unit each time the plunger strikes the plug. These elements are not rigidly secured to the base of the valve but bear against the resilient packing means. At impact by the plunger, a cushioning effect is provided by the packing means which reduces wear on mating surfaces and prevents fatigue of a nature that can result in fracture of parts such as the sleeve or its joint with the plug. As another aspect of the invention, the plunger is provided with an axial central passage within which a closure member is slidably movable. The closure member includes sealing means disposed to open and close sequentially the base flow passage and a flow passage in the plug. Slide means are movably mounted on the closure member to be engageable by the plunger when the plunger is moved responsive to energization or de-energization of the coil. A first spring means between the plug and the slide means biases the closure member toward one end of the sleeve. A second spring means disposed between the slide means and a part of the closure member biases the latter toward the other end of the sleeve when the slide means is moved toward said end by the plunger. When, for example, the second spring means biases the closure member toward the plug passage, it places the sealing means of the closure member in positive sealing engagement with the plug passage while the plunger moves without interference toward proper engagement with the surface of the plug.

In prior art devices, the plunger itself commonly carries the sealing means. Because the relative dimensions are critical, difficulties are encountered on a production basis to dimension the parts so as to seal the passage and simultaneously seat the plunger against the plug. The provision of the second spring means and slidable closure means, as described above, enables a force to be exerted which properly seats the sealing means without interfering with seating of the plunger. Improper seating of the plunger can result in energy-consuming "chatter" of the plunger when AC power is utilized.

As yet another aspect of the invention, the plunger is provided with one or more longitudinal slots for passage of fluid through the sleeve. A transverse passage connects each longitudinal slot with the axial central passage of the plunger. The cross-passages serve as venting passages which reduce pulsations in fluid flow and enable better seating of the sealing means.

The above-described features of the invention and their advantages will be better understood from the following description made in conjunction with the accompanying drawing.

With reference to the drawing, a 3-way solenoid pilot valve 10 is shown. Although the features of the present invention are described with reference to this particular configuration of such a valve, it will be understood and apparent from the following description that these features can also be advantageously utilized in other configurations of valves of this general type.

A generally cylindrical base 12 is provided with an axial chamber 14 having three bores of differing diameters. Lowermost bore 16 has the smallest diameter while uppermost bore 18 has the largest diameter. A first fluid flow passage 20 in the base includes a port 22 which is coaxial with chamber 14. A second fluid flow passage 24 in the base opens into the intermediate bore of chamber 14 at a point spaced apart from the point of entry of port 22. The base fluid flow passages are threaded for pipe connections with other components and a source of pressure fluid. A seating member 26 is sealingly fitted into the lowermost bore and includes a central bore 28 aligned with port 22.

A tubular sleeve 30 of nonmagnetic material has at its lower end a peripheral outwardly extending flange 32 adapted to seat on a shoulder 34 formed between the uppermost bore and intermediate bore of chamber 14. The interior of the sleeve is in axial alignment with chamber 14 and bore 28 in the seating member. A reinforcing sleeve 36 shaped to correspond to flange 32 is preferably fitted to abut the flange and is held against it by an O-ring 38 of resilient material disposed between the reinforcing sleeve and a clamping plate 40. Although not essential, the reinforcing sleeve does materially extend the service life of the tubular sleeve and is preferably brazed to the flange 32 to provide a fluid-tight joint.

The clamping plate is fastened to he base by a pair of screws 42 so that the flange is securely but resiliently joined to the base. Since O-ring 38 is disposed on the upper surface of flange 32 through the medium of reinforcing sleeve 36 and faces the upper end of sleeve 30, it acts as a resilient cushion and sealing ring, as will be described. It will be understood that resilient packing elements other than an O-ring can be utilized to provide the cushioning and sealing effect.

A cylindrical plug 44 is secured in the upper end of the sleeve as by brazing or the like and includes a flow passage 46 opening into the interior of the sleeve coaxially with the sleeve. An assembly nut 48 threadably joined to the upper portion of plug 44 secures a generally cylindrical magnetic steel casing 50 to the base. The assembly nut includes a flow passage 51 in alignment with passage 46 of the plug.

The casing has a closed end provided with a central opening through which plug 44 extends. At its open end, the casing rests on a peripheral ledge 52 formed on the base and abuts the peripheral edge of clamping plate 40. The casing thereby defines an enclosure 53 within which an electromagnetic coil 54 is positioned to surround the upper portion of sleeve 30 and plug 44. A coupling 56 is fitted through the casing and provides a conduit for electrical leads 58 to the electromagnetic coil. As is known to the art, and as is shown in the drawing, O-rings are provided where necessary to provide fluid-tight integrity to the valve structure.

A plunger 60 of electromagnetic material is slidably fitted within sleeve 30. The plunger includes one or more longitudinally extending slots 62 and a central axial passage 64. A cross-bore 66 places each slot in flow communication with the central passage.

A closure member or poppet 68 is disposed within the central passage of the plunger. In the embodiment shown, the poppet consists of a cylindrical spacing tube 70 into which poppet valves 72, 74 are fitted at opposite ends. Upper valve 72 includes a rubber or other elastomeric sealing element 76 molded into a bore, and a shank 78 secured by crimping or the like in the spacing tube. Lower valve 74 corresponds in structure to the upper valve and includes a sealing element 80 and a shank 82. The poppet valves have a diameter less than plunger passage 64 to the extent enabling aligned slidable movement while providing an annular passage for flow of fluid, as will be described. The poppet is guided at its upper end by the inner faces of the encircling plunger spring coils and at its lower end by a reduced diameter portion of passage 64.

The diameter of the poppet valves is greater than that of the spacing tube so that a spring enclosure 84 is defined between the tube and plunger passage 64. The bottom of upper valve 72 provides an upper shoulder 86, and the top of lower valve 74 provides a lower shoulder 88. A slip ring 90 having a diameter enabling slidable movement on the spacing tube rests upon lower shoulder 88. A plunger coil spring 92 is disposed in the spring enclosure 84 between the slip ring and plug 44. A poppet coil spring 94 is disposed radially inwardly of the first coil spring between the slip ring 90 and upper shoulder 86.

The valve as shown in the drawing is in a normally closed position with the electromagnetic coil de-energized. In this position, lower poppet valve 74 is biased against seating member 26 by the plunger spring so as to close bore 28 to fluid flow. The seating member is provided with a downwardly sloping surface adjacent the opening of bore 28 so that the plunger bears against the seating member at a level below the level at which poppet valve 74 engages the seating member. As a result, a gap 96 is provided between the lower surfaces of the slip ring and the portion of the plunger which engages the slip ring upon upward movement of the plunger. This gap is typically of the order of 1/32 of an inch.

In the position shown in the drawing, fluid flow is through flow passage 24 into axial chamber 14, then through longitudinal slots 62 of the plunger to be exhausted through passages 46 and 51. The length of the poppet and plunger is such that the upper poppet valve is spaced from passage 46 in the normally closed position.

When the electromagnetic coil is energized, the plunger of magnetic material is moved upwardly against the biasing force of the plunger spring. After the plunger moves the length of gap 96, it engages the slip ring. Continued upward movement of the plunger moves the slip ring upwardly and removes the biasing force holding lower poppet valve 74 against seating member 26. The pressure of fluid within first fluid flow passage 20 moves the poppet upwardly from its sealing engagement. The compressive force of poppet spring 94 assists in urging the upper poppet valve against plug 44 to block passage 46 to fluid flow.

As is seen in the drawing, a portion of plug 44 defining passage 46 projects into the interior of the sleeve. The upper poppet valve engages this portion as the plunger continues its movement toward the plug surface around the projecting portion. Although the over travel of the plunger may be as little as 0.020 to .030 inch, it is sufficient to compress the poppet spring additionally so that the upper poppet valve is securely seated against the plug.

In the energized position, fluid flow is through first flow passage 20, port 22, bore 28, and into the axial chamber. Since exhaust passage 46 is closed, the fluid leaves the axial chamber and passes through second flow passage 24 in the base.

When the electromagnetic coil is de-energized, the compressive force of the plunger spring returns the slip ring to lower shoulder 88 and urges the poppet downwardly toward the seating member. The lower poppet valve seats against the seating member while the inertia of the plunger continues its movement until it engages the downwardly sloping surface of the seating member. Because of this, gap 96 is opened. At the time the electromagnetic coil is de-energized, the sleeve and the axial chamber are filled with fluid under pressure. As passage 46 is opened by unseating of the upper poppet valve, there is a tendency for the fluid within these spaces to exhaust rapidly through this passage. Since, simultaneously, bore 28 is partially open, the egress of pressurized fluid from bore 28 makes it difficult to seat the lower poppet valve so as to close bore 28 completely. This is particularly true where the fluid pressure in bore 28 is in excess of 120 p.s.i. By providing crossbores 66, an additional passage for escape of fluid from within the chamber is provided. The fluid passes through the cross-bores into the spring enclosure and then upwardly through the annular space between the upper poppet valve and the plunger. The provision of the crossbores enables prompt and effective seating of the lower poppet sealing surface.

A shading ring 98 is provided in the face of plug 44 in valves operated by alternating current.

In the case of a normally closed valve, the compression loading of the plunger spring is several times that of the poppet spring. For example, the compression loading of the plunger spring may be about 3 lbs., whereas the compression loading of the poppet spring may be about 6 oz. It can be seen that the valve structure shown in the drawing can be arranged for normally open operation by reversing the compression loading of the plunger and poppet springs. When this is done, the poppet spring holds passage 46 closed when the coil is energized, and the plunger spring combines with the pressure fluid to close bore 28 when the coil is de-energized.

It will be evident to those skilled in the valve art that various modifications and changes may be made within the scope of the invention, as has already been described. The description made illustrates a specific embodiment of the invention and is not intended to limit its scope in any way.

What is claimed is:

1. A solenoid-actuated valve comprising a base having an axial chamber, a first fluid flow passage opening into the chamber coaxially with the chamber, and a spaced-apart second fluid flow passage opening into the chamber, a portion of the base defining the first flow passage projecting into the chamber; a tubular sleeve within the chamber; a plug secured within the end of the sleeve removed from the base and including a third fluid flow passage opening into the sleeve coaxially with the sleeve, a portion of the plug defining the third flow passage projecting into the sleeve; a plunger of magnetic material slidably movable within the sleeve and including an axial central passage having a diameter larger than each of the projecting portions of the plunger to engage the base or the plug without engaging their respective projecting portions; a closure member slidably movable within the plunger central passage and including sealing means at opposite ends disposed to engage the projecting portions of the base and plug, respectively; slide means movably mounted on the closure member to be engageable by the plunger; first spring means between the plug and the slide means to bias the closure member to close the first flow passage; second spring means disposed between the slide means and a part of the closure member to bias the closure member to close the third flow passage when the slide means is moved toward said passage by the plunger; and an electromagnetic coil around the sleeve for moving the plunger against the biasing force of the first spring means when the coil is energized.

2. Valve in accordance with claim 1 wherein the first spring means has a compression loading substantially greater than the compression loading of the second spring means.

3. Valve in accordance with claim 1 wherein the second spring means has a compression loading substantially greater than the compression loading of the first spring means.

References Cited

UNITED STATES PATENTS 2,404,349  7/1946  Brant et al. _____ 137—625.65

FOREIGN PATENTS 243,541  7/1963  Australia.
1,300,561  6/1962  France.
590,052  3/1959  Italy.

M. CARY NELSON, *Primary Examiner.*

H. KLINKSIEK, *Assistant Examiner.*